United States Patent
Zahorcak

(10) Patent No.: US 10,365,635 B2
(45) Date of Patent: Jul. 30, 2019

(54) PRODUCTION MODULE FOR PERFORMING A PRODUCTION FUNCTION ON A PRODUCT

(71) Applicant: Siemens Aktiengesellschaft, Munich (DE)

(72) Inventor: Vladimir Zahorcak, Borinka (SK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/526,197

(22) PCT Filed: Nov. 13, 2014

(86) PCT No.: PCT/EP2014/074503
§ 371 (c)(1),
(2) Date: May 11, 2017

(87) PCT Pub. No.: WO2016/074728
PCT Pub. Date: May 19, 2016

(65) Prior Publication Data
US 2017/0322542 A1  Nov. 9, 2017

(51) Int. Cl.
G05B 19/4097 (2006.01)
G05B 19/042 (2006.01)

(52) U.S. Cl.
CPC ..... *G05B 19/4097* (2013.01); *G05B 19/0426* (2013.01); *G05B 2219/33053* (2013.01);
(Continued)

(58) Field of Classification Search
CPC ............ G05B 19/4097; G05B 19/0426; G05B 2219/35134; G05B 2219/33068;
(Continued)

(56) References Cited

U.S. PATENT DOCUMENTS 4,698,629 A    10/1987  Mori et al.
5,561,742 A *  10/1996  Terada ................... B25J 9/1669
                                            700/249
(Continued)

FOREIGN PATENT DOCUMENTS

CN    10788787     7/2010
CN    103717350    4/2014
(Continued)

OTHER PUBLICATIONS

Jennings N.R. et al.; "Designing a reusable co-ordination module for co-operative industrial control applications"; IEE Proceedings. C. Control Theory & Applications; Institution of Electrical Engineers; GB; Ed. 143; Nr 1; pp. 91-102; XP006006299; ISSN: 0143-7054, DOI:10.1049/IP-CTA,19960186; 1996.

(Continued)

*Primary Examiner* — Christopher E. Everett
(74) *Attorney, Agent, or Firm* — Cozen O'Connor

(57) ABSTRACT

A production module for implementing a production function on a product, wherein the production module is configured couple to a second production module which is configured implement a second production function on the product, where self-description information relating to properties of the production module is stored on a storage device of the production module, and the second production module comprises second self-description information relating to properties of the second production module, where the production module is further configured to transmit the self-description information to the second production module and to receive second self-description information from the second production module, and where port information relating to the coupling process with the second production module is stored on the storage device, or the production (Continued)

module is configured to store port information relating to the coupling process with the second production module.

22 Claims, 7 Drawing Sheets

(52) U.S. Cl.
CPC .............. *G05B 2219/33055* (2013.01); *G05B 2219/33068* (2013.01); *G05B 2219/33072* (2013.01); *G05B 2219/35134* (2013.01); *Y02P 90/265* (2015.11)

(58) Field of Classification Search
CPC ........... G05B 2219/33055; G05B 2219/33053; G05B 2219/33072; Y02P 90/265
See application file for complete search history.

(56) References Cited

U.S. PATENT DOCUMENTS

| | | | |
|---|---|---|---|
| 5,914,880 A | 6/1999 | Yasojima et al. | |
| 5,984,498 A | 11/1999 | Lem et al. | |
| 7,069,096 B1 | 6/2006 | Maturana et al. | |
| 8,818,558 B2* | 8/2014 | Cassano | B25J 9/1666 700/255 |
| 9,144,904 B2* | 9/2015 | McGee | B25J 9/1666 |
| 10,005,185 B2* | 6/2018 | Pfaff | B25J 9/0087 |
| 2004/0268186 A1 | 12/2004 | Maturana et al. | |
| 2005/0273200 A1* | 12/2005 | Hietmann | B25J 9/1666 700/248 |
| 2007/0150093 A1* | 6/2007 | Nagatsuka | B25J 9/1682 700/235 |
| 2008/0021589 A1 | 1/2008 | Sandmeier | |
| 2011/0224828 A1 | 9/2011 | Breznak et al. | |
| 2014/0277713 A1 | 9/2014 | Kouno et al. | |

FOREIGN PATENT DOCUMENTS

| | | |
|---|---|---|
| CN | 104044133 | 9/2014 |
| EP | 2754532 A1 | 7/2014 |
| JP | S 59-75303 | 4/1984 |
| JP | H 06-63851 | 3/1994 |
| JP | 2003-208208 | 7/2003 |
| JP | 2006-035346 | 2/2006 |
| JP | 2013-027954 | 2/2013 |
| KR | 2000-0057155 | 9/2000 |
| RU | 2365480 C2 | 8/2009 |

OTHER PUBLICATIONS

Office Action dated Jul. 10, 2018 issued in the corresponding Japanese Patent Application No. 2017-525877.
Office Action dated Dec. 27, 2018 issued in Chinese Patent Application No. 201480083363.4.
Office Action dated Nov. 20, 2018 issued in Japanese Patent Application No. 2017-525877.
Office Action dated Nov. 21, 2018 issued in Korean Patent Application No. 10-2017-7016023.
Decision of Rejection dated May 14, 2019 issued in Japanese Patent Application No. 2017-525877.

\* cited by examiner

PRODUCTION MODULE FOR PERFORMING A PRODUCTION FUNCTION ON A PRODUCT

CROSS-REFERENCE TO RELATED APPLICATIONS

This is a U.S. national stage of application No. PCT/EP2014/074503 filed 13 Nov. 2014.

BACKGROUND OF THE INVENTION

1. Field of the Invention

The present invention relates to a production module for performing a production function on a product, where the production module is configured to couple to a second production module that is configured to perform a second production function on the product.

2. Description of the Related Art

In general, production modules are known. As such, the published specification US 2011/0224828 A1, for example, discloses a system for developing robots and other "cyber-physical systems" (CPS). The system comprises a platform that allows the processing of actuators and sensors and other modules. Various modules are disclosed that are usable for particular tasks known in robotics. These tasks may be the drive for motors or the reading and control of sensors, for example. The modules communicate with one another and with further devices, such as computers and user-created modules, for example, using a standard communication protocol.

A disadvantage of the prior art is that a relatively large amount of collaboration by a user is required for creating such a system.

SUMMARY OF THE INVENTION

In view of the foregoing, it is therefore an object of the present invention to simplify the design of a modular production system.

This and other objects and advantages are achieved in accordance with the invention by a production module which is configured to perform a production function on a product and additionally to couple to a second production module. The second production module is in turn configured to perform a second production function on the product. Here, a memory device of the production module stores a piece of self-description information regarding properties of the production module, and additionally the second production module comprises a second piece of self-description information regarding properties of the second production module. The production module is configured to transmit the piece of self-description information to the second production module and to receive the second piece of self-description information from the second production module. The memory device of the production module additionally stores a piece of port information regarding the coupling to the second production module. Alternatively or additionally, the production module may be configured to store an applicable piece of port information regarding the coupling to the second production module.

With the presence of the self-description information of the first and second production modules and the possibility of the information being reciprocally transmitted to one another and the simultaneous presence of a piece of port information regarding the coupling to the second production module in the first production module, there is both information about the capabilities of the modules and a piece of information about a coupling to the second production module present in the production module. Hence, the first production module can be rendered able to cooperate with the second production module for the treatment or conditioning of a product with relatively little or without user action, for example. This simplifies the design of a production system comprising the two production modules, for example.

Production modules may be a wide variety of mechanical, electromechanical or electronic devices that are configured to treat, move, process and/or condition an item, workpiece, a liquid or comparable products, assemblies or materials. Production modules may be tool modules, machine tools (e.g., for milling, drilling, punching, or pressing) or similar tools, equipment or machines or elements thereof, for example. Additionally, production modules may also be configured to at least, inter alia, transport products, assemblies or materials, such as a conveyor belt, crane, robot arm, or pump. Additionally, production modules may also be configured to store or supply appropriate products (e.g., comprising a shelf system, or tank). The production module may also be configured, by way of example, to heat or otherwise condition workpieces, assemblies and/or solid, liquid or gaseous materials, such as a furnace, kettle, valve, or stirrer.

The production module itself may in turn be constructed from multiple parts, assemblies and/or submodules and/or, by way of example, may have one or more mechanical and/or electronic subunits.

A production module may be a control unit or a controller configured to control the production function and/or the methods, processes and investigations described in the present description with reference to the production module, for example. Additionally, the production module may comprise one or more communication interfaces and also one or more memory devices for storing data and/or information. To perform the production function, the production module may also comprise appropriate mechanical, electrical, electronic and/or electromechanical or optical components.

In particular, the production module may be configured as what is known as a "cyber-physical system" (CPS) or part thereof. As such, the production system may be configured as what is known as a "cyber-physical module" (CPM) or a "cyber-physical production module" (CPPM), for example.

A production function is understood in the present invention to mean generally any process that is performed or can be performed in the production, manufacture, processing, treatment or conditioning of an item, a material or a substance. A production function may in this case be, e.g., any possible work step for an arbitrary product from the initial materials to the finished end product.

By way of example, a production function can comprise any type of material conditioning (e.g., milling, drilling, grinding, pressing, painting, casting, pumping, heating, moving, opening, or closing), any type of transport or movement or handling of an item, of an assembly, of a material or of a substance, or processes of this kind. Additionally, the production function may be, by way of example, storage, diagnosis, checking, optical recording, measurement, determination of a shape, situation or size or comparable functionalities, or may comprise such functionalities.

A product may comprise a mechanical, optical, electromechanical, electronic or comparable product or assembly, for example, or may comprise such products or assemblies. Additionally, the product may comprise a workpiece, an assembly, a solid, or liquid or gaseous material, a solid, liquid or gaseous chemical, for example. The product may also be any type of intermediate product or the end product of a particular production process, for example. End products may be all types of products that are sold commercially, such as, a microchip, a computer, a camera, a car, a chemical, or a substance, or any types of intermediate products for such products.

In the present invention, the term "product" is used as an abstract description of an item that is by all means variable in production or conditioning. A "product" as defined in the present invention can by all means vary in its outer or inner appearance or embodiment in the course of a production process, for example, as a result of the action of production functions.

The coupling of the production module to the second production module may be configured such that the production function of the production module and the second production function of the second production module can interact or do interact. Such interaction of production functions may be joint conditioning of a product, conditioning and transport of a product or transfer of a product from one transport unit to another, for example. To this end, two production modules may be in a suitable geometric arrangement, for example, and coupled, e.g., electronically such that the interaction of the production functions is made possible or is performed or is performable.

The coupling of the production module to the second production module may be configured as a communicative coupling, for example, via appropriate wired or wireless communication interfaces (e.g., via Ethernet, Profinet, Profibus, field buses, WLAN, Bluetooth, or NFC) or may comprise communicative coupling of this kind.

Additionally, the coupling of the production modules may also comprise a mechanical coupling, such as, via appropriate connecting elements. For a mechanical coupling of this kind, a production module can have or comprise appropriate connecting elements, sensors and/or actuators, for example.

The second production module may be configured in accordance with the production module or first production module described in accordance with the present invention, for example. Additionally, the production modules may each be coupled to further production modules that in turn may each be configured in accordance with a production module or a first production module in accordance with the present invention. In this case, the coupling to the respective other production modules may also be configured as explained in more detail in accordance with the present invention.

The piece of self-description information regarding properties of the production module can comprise a wide variety of information regarding the production function of the production module, for example. In particular, it can comprise an identifier or characterization of the functionality or functionalities that is or are implemented in the production function, for example. Additionally, it can comprise information about conditionable or processable materials or items, information about size stipulations, shape stipulations, weight stipulations or similar stimulations or prerequisites, information about one or more conditioning areas of the production module, information about quality criteria or results and/or prerequisites regarding the production function or the relevant work result or product or similar information regarding the production function.

The piece of self-description information can also comprise information about other properties of the production module, such as a size, a geometry, a situation, an identification identifier, a design, a configuration, available services and functionalities, connected equipment, modules and/or assemblies, available control commands and other commands and also available communication interfaces, applicable communication parameters (e.g., MAC address) and/or a piece of state information regarding the production module.

The piece of self-description information regarding properties of the second production module and also regarding further production modules cited in the present description may be designed and set up in accordance with the statements above.

The transmission of the piece of self-description information between the production modules can occur or may comprise as wired and/or wireless communication, for example. Such a transmission can occur or may configured via Ethernet, field buses, WLAN, Bluetooth, NFC, optically. For coupling the second production module to the first module, there may be provision for the second piece of self-description information of the second production module to be sent to the production module, for example. Additionally, the piece of self-description information of the production module can also be sent to the second production module. There may also be provision for an interchange of the self-description information between production module and second production module.

The piece of port information stored in the first production module regarding the coupling to the second production module can comprise a piece of information about the second production function of the second production module, for example. Additionally, the piece of port information can comprise a piece of information about an interaction of the production function of the production module and the second production function of the second production module. Such information may be information about a transfer area or interaction area, for example, in which a product must or can be located, for example, in order to allow such interaction of the production functions.

Such interactions may be joint conditioning of a product, conditioning of a product located in a transport module or the transfer between two transport modules, for example.

Additionally, the piece of port information can comprise the second piece of self-description information of the second production module entirely or in part. Additionally, the piece of port information can also comprise information about further modules, production functions and/or functionalities attainable via the second production module. Such information about such further modules and production functions can correspond to the aforementioned information regarding the second production module.

Additionally, the production module may also be coupled directly to one or more further production modules in accordance with the present invention, provision additionally being able to be made for the production module to be used to store, or to store already, for each of the further production modules connected directly to the production module, an applicable piece of port information regarding the coupling to the respective production module. This piece of port information may be configured in accordance with the above-described piece of port information regarding the coupling to the second production module.

The piece of port information regarding the coupling to the second production module or to further production modules can be ascertained in the production module, for example, or in an external computer or a comparable device, and then transmitted to the production module. In this case, the "ascertainment" is understood to mean a pure data extraction from applicable messages or the reading of applicable information data, for example, but also the processing of conveyed or transmitted data or information.

In an advantageous embodiment, the piece of port information regarding the coupling to the second production module can comprise a piece of information about a three-dimensional interaction area of the production module with the second production module, where the three-dimensional interaction area is characterized in that both the production function of the production module and the second production function of the second production module can influence the product when it is located in the interaction area.

The piece of information about the interaction area can allow the production modules, e.g., to cooperate with reduced or without user collaboration, because the production module knows which three-dimensional area must contain the product or material to be conditioned or handled in order for it to be conditioned or handled both by the production module itself and by the second production module. This further simplifies the configuration and operation of an applicable production system.

In particular, there may be provision for the interaction area to be ascertained or ascertainable based on the piece of self-description information of the production module and the second piece of self-description information of the second production module. This ascertainment can be effected in the production module, in the second production module and/or in an external computer or similar device, for example.

For this purpose, the respective self-description information can each store a work area of the respective modules, for example, and then the interaction area can be ascertained via the knowledge of the respective work areas and also the relative situation of the production modules in relation to one another. Here, the piece of information pertaining to the relative situation of the production modules may be prescribed or prescribable, for example, or can also be ascertained automatically or by a user. In an advantageous embodiment, there may additionally be provision for the second production module also to store a piece of information about the interaction area, where the piece of information can be transmitted from the production module to the second production module, for example, or can be ascertained by the second production module or a further computer device separately. Here, it would then be possible, by way of example, for the various computed interaction areas to be collated, such as to improve the coupling.

The piece of port information can then comprise a piece of information about a geometry of the interaction area and/or a position of the interaction area, for example. Here, the geometry and/or position may be stored in applicable module coordinates or another coordinate system, such as a coordinate system shared by both production modules.

It is also an object of the invention to provide a production module for performing a production function on a product, where a memory device of the production module stores or can be used to store a piece of self-description information regarding properties of the production module, where the production module is additionally configured to ascertain a shared three-dimensional interaction area with a second production module coupled to the production module, where the second production module is configured to perform a second production function on the product and where additionally the shared three-dimensional interaction area of the production modules is characterized in that both the production function of the production module and the second production function of the second production module can influence the product when it is located in the interaction area.

A production module configured in this manner simplifies the design of a system comprising such production modules by, e.g., using the ascertainment of the interaction area in the production module to reduce the coupling complexity between two production modules by using the ascertainment of the interaction area to allow or simplify cooperation by the two modules.

In this case, the production module, the production function, the piece of self-description information regarding the properties of the production module and also the second production module with the applicable second production function and also the interaction area and the ascertainment of the interaction area in accordance with the present invention may be configured.

The shared three-dimensional interaction area with the second production module can be ascertained, by way of example, using data transmitted by the second module regarding an available work area of the second module in conjunction with, e.g., information stored in the piece of self-description information of the production module concerning its own work area. In addition, this ascertainment can involve using additional situation information regarding a situation, position and/or orientation of the two modules relative to one another, for example. Alternatively, the interaction area can also be ascertained from a known or ascertained position, situation and/or orientation data of the production module and of the second production module, for example. In particular, previously known properties and embodiments of the production module and/or of the second production module can be included, in this case.

The situation or relative situation of the two production modules can be indicated or ascertained by a user, for example (e.g., via robot arms, or sensors), or can be ascertained using position finding systems such as GPS, cameras, optical sensors, radio sensors, ultrasonic sensors or comparable systems or combinations of such systems.

The ascertainment of the shared three-dimensional interaction area can be initiated by a user, for example, or automatically when the modules are coupled or automatically on any coupling and/or change of situation or other changes regarding at least one of the modules.

The interaction area can be formed such that the production module and the second production module can interact or do interact with their respective production functions regarding the product. Such interaction may, by way of example, be in the form of joint conditioning or treatment of the product, conditioning or treatment of a product that is positioned, via a suitable transport system, in a situation provided for treatment or conditioning, or transfer between production modules provided for the transport of materials, items or products. Further possibilities for interaction of the production functions arise from the various embodiment options that the present description contains, for example, for the production functions.

The coupling of the production module to the second production module may be configured as explained in more detail in accordance with the present invention, for example.

In an advantageous embodiment, the memory device of the production module stores or can be used to store a piece of port information regarding the coupling to the second production module, where the piece of port information comprises a piece of information about the three-dimensional interaction area of the production module with the second production module. In particular, the piece of information about the three-dimensional interaction area comprises a piece of information about a geometry of the interaction area and/or a position of the interaction area.

In this way, the piece of information about the interaction of the production modules is stored and configured in a meaningful manner, which further simplifies the configuration of an applicable production system comprising such modules by virtue of said configuration being able to allow semi-automation or automation of coupling of two modules, for example.

The piece of port information, the three-dimensional interaction area of the production modules and the piece of information about the geometry and position of the interaction area may be configured as explained in more detail in accordance with the present invention.

In particular, a position of the interaction area may, by way of example, be indicated and/or stored in applicable module coordinates or a further coordinate system, such as a shared coordinate system of the modules. The same applies to the geometry, such as the three-dimensional embodiment, of the interaction area.

In general, a production module in accordance with the present invention may advantageously be configured such that the piece of port information regarding the coupling to the second production module comprises a piece of information regarding properties of the second production module. In particular, the piece of port information may in this regard comprise information regarding the second production function of the second production module.

By way of example, such a piece of information stored in the piece of port information regarding the coupling to the second production module allows advance planning of what further possibilities for conditioning or transport become possible for a product located on the production module via the coupling to the second production module. This allows production planning for the product and therefore simplifies the configuration and operation of a production system comprising such production modules.

Here, the information regarding properties of the second production module may be configured in accordance with the information regarding properties of the production module. By way of example, the information regarding the properties of the second production module can comprise a piece of information about the size, situation and/or position thereof, identification characteristics or parameters, information about communication interfaces and possibly applicable parameters of such interfaces (e.g., an MAC address), available production or other functions and/or services of the second production module and comparable information.

In an advantageous embodiment, the piece of port information that is stored in the production module regarding the coupling to the second production module can comprise information regarding properties of further production modules directly and/or indirectly connected to the second production module. In particular, the piece of port information that is stored in the production module regarding the coupling to the second production module can comprise information regarding production functions of production modules directly and/or indirectly connected to the second production module.

In this way, the configuration and operation of a production system comprising such production modules can be further simplified in that, when there is a product located in a particular production module, only the piece of port information regarding a coupled second production module can be used to identify which further production modules and/or production functions are available or attainable via coupling to or interaction with the second production module.

Here, properties of further production modules connected to the second production module may be such properties as are explained in more detail for self-description information of a production module, for example, at another juncture in accordance with the present invention.

In particular, the piece of port information regarding the coupling to the second production module can comprise properties regarding all further production modules directly and/or indirectly connected to the second production module. Additionally, the stored information regarding the properties of the further production modules can also comprise particular categories of production modules, technical restrictions, spatial restrictions or functional restrictions.

Here, further production modules directly connected to the second production module are modules that have a direct coupling or link to the second production module. Indirectly connected further production modules are those that have no direct coupling to the second production module, but rather are in turn attainable from the second production module via other production modules.

Two production modules are directly connected if the modules are "actively" connected, for example, i.e., if their production functions (as already explained) interact or can interact in accordance with the present invention, for example. In particular, they are directly connected if they are already or are now coupled in accordance with the present invention. As such, two connected transport modules can allow continuous transport of a product with an applicable transfer between the modules, for example. A conditioning unit connected to a further module can then allow conditioning of a product located in the other module or joint conditioning with the other module, for example.

Additionally, the piece of self-description information stored in the production module in accordance with the present invention can comprise a piece of configuration information regarding a situation and/or embodiment of the production module.

The piece of self-description information can also comprise a piece of capability information regarding available functions and services of the production module, where the piece of capability information is able to comprise a piece of information about the production function, for example.

Additionally, the piece of self-description information can also comprise a piece of instruction information regarding instructions executable or understandable by the production module and adjustable or adjusted parameters.

Also, the piece of self-description information can also comprise a piece of state information regarding a work state. Here, a work state can comprise a current operating state (fully functionally active, partly functionally active, inactive, or emergency mode) or information regarding faults and warnings that have occurred or the like, for example. The piece of state information can additionally comprise a piece of information about a product present in or on the production module (e.g., an applicable product ID, a current conditioning state, or a current position within the production module).

The piece of configuration information of the production module can comprise a position, a functional embodiment and/or a geometric embodiment of the production module, for example. Additionally, the piece of configuration information of the production module can also comprise an available and/or accessible three-dimensional work area or a physical and other environment (e.g., adjacent modules, machines, or safety areas).

The piece of port information that is stored in the production module regarding the coupling to the second production module can comprise information regarding properties of a third production module coupled to the second production module, where the third production module is coupled to the second production module, the third production module stores or can be used to store a third piece of self-description information regarding properties of the third production module, and the third production module is configured to perform a third production function on the product.

In this case, the piece of information regarding the properties of the third production module coupled to the second production module can comprise a piece of information regarding the third production function of the third production module, and additionally the coupling of the third production module to the second production module may be configured in accordance with the coupling that is explained in accordance with the present invention between the production module and the second production module. The piece of self-description information of the third production module or the third production function of this module may additionally be configured in accordance with the applicable information or functions of the production module or second production module in accordance with the present invention.

Information about the third production module can reach the production module, for example, by virtue of, e.g., the piece of self-description information or portions thereof being transmitted, via the second production module, to the production module and being stored therein, as part of the stored piece of port information, in full, in part or following applicable conditioning or processing.

Additionally, there may also be provision for further or all production modules indirectly or directly connected to the second production module to comprise such self-description information and for the latter to be transmittable or transmitted to the production module via the second production module. In this way, an applicable piece of information pertaining to these further production modules can likewise be stored in the piece of port information regarding the coupling to the second production module. In this way, information about functionalities, properties, states or further parameters of multiple or all production modules additionally accessible via the second production module may likewise be available in the production module.

This allows an additionally simplified configuration or additionally simplified operation of an applicable production system comprising such production modules, because in this way there is the possibility of improved planning via further production steps that are intended to be performed with a product located in the production module.

It is also an object of the invention to provide a production system for manufacturing an end product or intermediate product, where the production system comprises a plurality of production modules according in accordance with the present invention and where the plurality of production modules are coupled to one another at least in part in accordance with the present invention.

By virtue of the production modules of the production system each comprising a piece of self-description information and a piece of port information or information about an interaction area with an adjacent or coupled module, the configuration and operation of such a production system are simplified, because the coordination and cooperation of the modules among one another are simplified via the information, as already explained in more detail in accordance with the present invention.

An intermediate product or end product is understood generally to mean any result of a production process, whether as a marketable intermediate product or merely an intermediate product available within a production process. As already explained for the term "product", an intermediate product or end product may also be an arbitrary item, an assembly, a material, or a chemical.

The plurality of modules can comprise two or more modules, preferably at least three to ten modules or more, for example.

The production system may additionally be configured such that each of the production modules of the plurality of coupled production modules stores or is used to store a piece of port information in accordance with the present invention for each production module, directly coupled to this production module, from the plurality of production modules. By way of example, this can mean that, for each further production module directly connected or coupled to one of the production modules, an applicable piece of port information is stored in the production module. In this case, the piece of port information may be configured in accordance with the present invention.

In this way, a production module then contains, for each module directly coupled thereto, an applicable piece of port information via which, e.g., additionally both the functionality and properties of the adjacent module and (as already explained above by way of example) further information about functionalities attainable beyond the adjacent production module are or may then be available and identifiable.

The presently contemplated embodiment further simplifies the planning and/or setup of a product located in a particular production module, for example, by virtue of the aforementioned port information already making available, in the production module, the information concerning which functionalities and devices are or may be available, attainable and/or usable via the closest neighbors of the production module and also respective modules downstream thereof.

The production system may additionally be configured such that a relative arrangement of the coupled production modules contained corresponds to a prescribed or prescribable three-dimensional and/or two-dimensional structure. As such, the configuration of a production system, for example, can involve a certain two-dimensional element shape or three-dimensional element shape having been prescribed or being prescribed, which form a grid to which the individual production modules of the production system must or can be added. Modules having, e.g., a standard two-dimensional or three-dimensional structure, shape or embodiment can then be arranged geometrically with respect to one another, e.g., in the style of a cellular network and can additionally then have been or be electrically and/or communicatively coupled accordingly.

Prescribing a three-dimensional and/or two-dimensional structure of this kind facilitates the configuration and assembly of an applicable production system, because, during the planning of the individual modules, it is already known where neighboring modules spatially adjoin this module and the module can be configured accordingly. In this way, a production system can possibly be constructed from applicable modules more easily and with reduced adjustment complexity. Two-dimensional structures can have or comprise square or hexagonal basic elements or similar shapes, for example.

To attain and/or observe a prescribed or prescribable three-dimensional and/or two-dimensional structure of this kind, applicable means may be provided or set up.

Such means may be a cell area provided in the installation or assembly area of the production system or of the production modules, for example. Such cell areas may be marked by graphical, optical, electronic or similar means or measures, for example. Based on such markings, the arrangement or assembly of the production modules for the production system can then be facilitated, simplified and/or controlled.

Additionally, such means for attaining and/or observing the prescribed or prescribable structure may be provided as connecting elements, distance sensors, markers or similar means on the individual production modules. Additionally, the means may also be spacers, frame portions or assembly platforms having applicable shapes or embodiments for the individual production modules, or can comprise such means.

Applicable connecting elements, such as, for mechanically coupling or fixing two or more production modules, can additionally also be used, or be usable, for electrically or communicatively connecting the modules. Additionally, there may also be provision for an electrical and/or communicative connection between the production modules to be attained via separate means.

It is also an object of the invention to provide a method for coupling a first production module to a second production module, where the first production module is configured to perform a first production function on a product and the second production module is configured to perform a second production function on the product, and additionally the first production module stores a first piece of self-description information regarding properties of the first production module and the second production module stores a second piece of self-description information regarding properties of the second production module.

In accordance with the invention, the method comprises coupling the first and second production modules, transmitting the second piece of self-description information of the second production module to the first production module, and ascertaining a first piece of port information regarding the coupling to the second production module via the first production module and storing the first piece of port information in the first production module.

The respective piece of self-description information that is present in the production modules and the ascertainment and application of a piece of port information regarding the second production module connected to the first production module allow the creation of a production cycle using such production modules to be simplified, because such data then, e.g., no longer need to be supplied to a production module, and configured, by a user or external measures, and the production module can be provided with a certain level of self-sufficiency in this way.

Here, the first and second production modules may be designed and set up in accordance with a production module of the present description. Additionally, the first and second pieces of self-description information, the piece of port information and also the coupling of the production modules may be configured in accordance with the present invention.

In particular, the coupling of the production modules both in the present context and generally for the modules and systems disclosed in accordance with the present invention may be configured such that interaction of the first production function of the first production module with the second production function of the second production module regarding the product is possible or occurs.

To this end, there may be an applicable spatial or geometrical arrangement of the production modules, for example, and/or also applicable electrical and/or communicative coupling, for example, in order to be able to coordinate applicable production functions. For the electrical and/or communicative coupling, mechanical coupling of the production modules can also occur, for example, in order to set or at least to stabilize the relative situation thereof in relation to one another. Additionally, connecting elements or structural elements may be provided for the individual production modules, which can allow or simplify or even force the formation of a correct orientation of the two production modules in relation to one another.

The ascertainment of the first piece of port information can, by way of example, consist of or comprise extraction of applicable information, such as from the transmitted second piece of self-description information of the second production module. Additionally, the ascertainment of the first piece of port information can also comprise applicable further processing of obtained information, if need be in combination with its own self-description information or further information.

The transmission of the second piece of self-description information can be initiated manually, for example, or automatically during setup or after setup of a communicative coupling. Additionally, the second piece of self-description information can be transmitted even and/or always when applicable properties, configurations and/or states of the second production module have changed. Here, such changing or changeable "states" may be, by way of example, different activity and availability states of the module, error or fault reports or states and/or also, e.g., a change of presence or situation of a product in the production module.

To this end, by way of example, there may additionally be provision for the first production module to be registered with the second production module as an applicable connected module and for every such change of the second production module to involve an accordingly updated piece of self-description information or update being sent to all production modules registered therewith.

Additionally, there may be provision for the coupling of the first and second production modules to be additionally followed by the first piece of self-description information of the first production module and/or the first piece of port information being transmitted to the second production module, and the second production module ascertaining a second piece of port information regarding the coupling to the first production module and storing said information in the second production module.

In this way, after coupling of the production modules, for example, the respective piece of information about the adjacent production modules and possibly, further, production modules connected or coupled thereto is stored or kept symmetrically in both production modules. In this way, a more flexible production cycle using the production modules is allowed, for example, because the nature of the distribution of the piece of information about the modules means that there are no prescribed workflow directions, but rather it is possible, from any production module, to attain the production modules coupled or connected thereto both mechanically, in terms of action, and communicatively.

In this case, the first and second pieces of port information can correspond at least structurally, for example.

The method described in the present case may additionally be implemented and set up such that the ascertainment of the first and/or second piece of port information comprises the ascertainment of a piece of information about a three-dimensional interaction area of the first production module with the second production module. In this case, the interaction area is characterized in that both the first production function of the first production module and the second production function of the second production module can influence the product when it is located in the interaction area.

Both the ascertainment of the interaction area and the piece of information about the three-dimensional interaction area may be configured in accordance with the present invention. The three-dimensional interaction area can be ascertained in the first production module, in the second production module or in an external computer or similar unit, for example. Additionally, the three-dimensional interaction area can also be ascertained in multiple instances of the units and then compared or collated with one another if need be, in order to possibly attain an improved interaction area.

Here, each of the production modules can describe the piece of information about the three-dimensional interaction area, at least the geometry and situation of the interaction area, in each case in module-specific coordinate systems of their own. Alternatively, there may also be provision for a shared coordinate system, for example, in which an applicable interaction area is or may be formulable and/or definable in a standard manner. The situation and/or geometry of the three-dimensional interaction area can be ascertained using information, stored in the respective self-description information, about available work areas and information about respective relative spatial positions or arrangements of the modules in relation to one another, for example.

By way of example, to improve an interaction between production modules that are coupled or are to be coupled, there may be provision for the ascertainment of the piece of information about the three-dimensional interaction area to be followed by the relative situation of the first in relation to the second production module being changed and then a piece of information regarding the three-dimensional interaction area being ascertained again in accordance with the present invention. In this way, it is possible to attain, more or less iteratively via applicable computation and adjustment, an improved, more suitable and/or enlarged interaction area and, hence, improved interaction of the production functions of the production modules, for example.

The first production module can, by way of example, also be coupled to the second production module such that the relative arrangement of coupled production modules corresponds to a prescribed or prescribable three-dimensional or two-dimensional structure. Here, the coupling, the embodiment of the production modules and/or also of an assembly surface for attaining a prescribed or prescribable three-dimensional or two-dimensional structure may be configured in accordance with the present invention. Additionally, further production modules may also be coupled to the first and/or second production module in the same way, so that a production system consisting of a larger number of production modules can also be constructed in this way.

Here, means for attaining and/or observing the prescribed or prescribable structure may in turn be provided, for example, where the first production module is coupled to the second using these means such that the relative arrangement of the coupled production modules corresponds to the prescribed or prescribable three-dimensional and/or two-dimensional structure.

As already explained above, the means for attaining the prescribed structure can comprise applicable connecting elements, for example, on each of the production modules.

Here, these may be configured and arranged such that the prescribed or prescribable three-dimensional or two-dimensional structure is obtained automatically for an applicable connection of the production modules via the connecting elements.

Additionally, for this purpose, there may also be applicable sensors, such as distance sensors, and/or applicable markers provided therefor or the means for attaining the prescribed structure can comprise such sensors. Also, such means may also be assembly platforms or housings or similar frame portions or structural elements with an applicable shaping that, for example by being joined or brought into contact with applicable other frame or assembly portions of other production modules, result in the prescribed or prescribable structure being constructed.

Also, in the construction or assembly area for the coupled production modules, applicable surfaces or three-dimensional areas may also be marked for the individual production modules, into which the production modules can or must then be fitted or adjusted, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail by way of example below with reference to the accompanying drawings, in which.

DETAILED DESCRIPTION OF THE EXEMPLARY EMBODIMENTS

Figure 1:
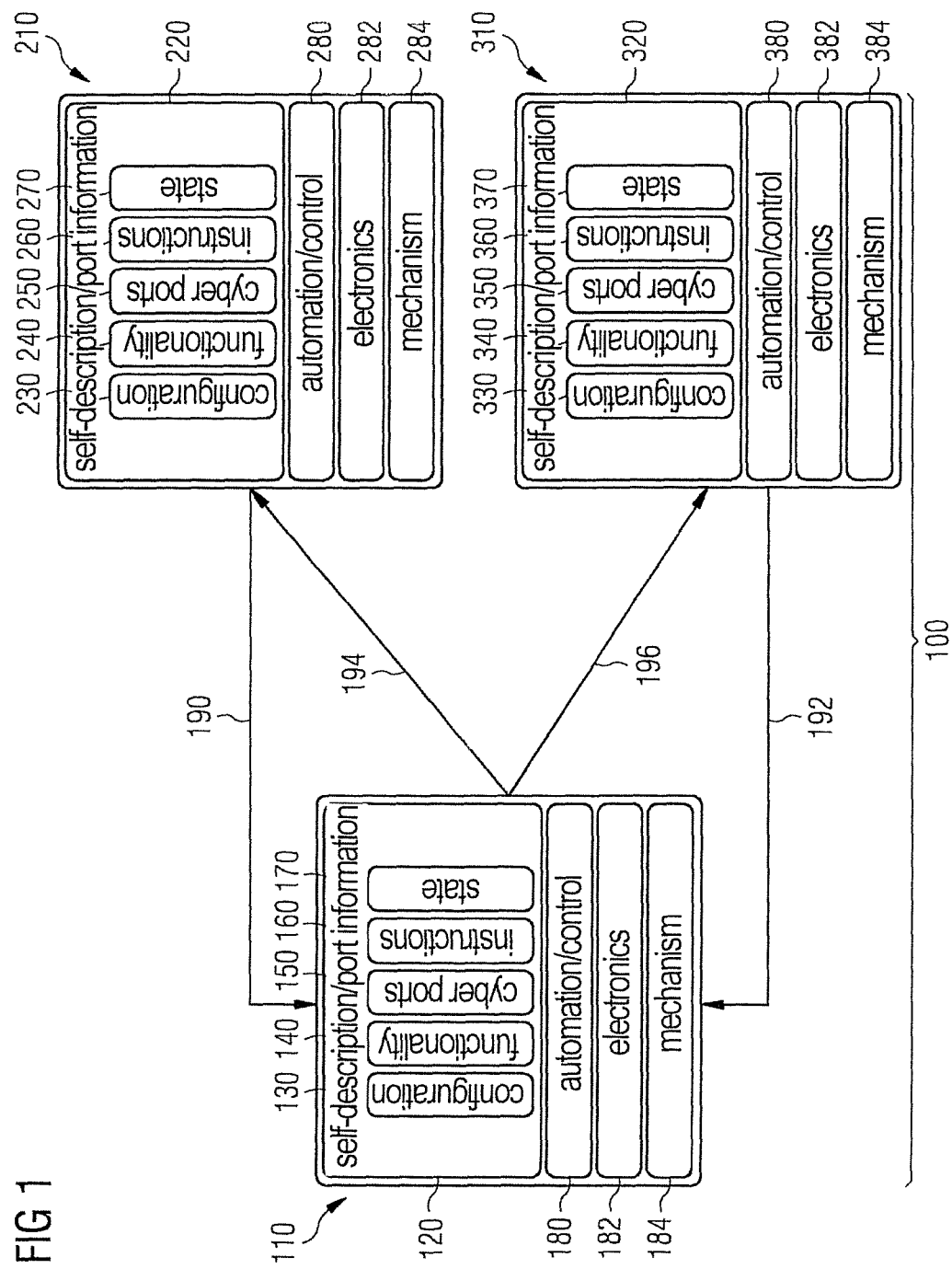
FIG. 1 shows an example of the configuration, data structure and communication structure of a production system constructed from production modules in accordance with the invention.

FIG. 1 shows a schematic design of a production system 100 having a first production module 110, a second production module 210 and a third production module 310, which are depicted schematically as squares in FIG. 1.

For each of the modules 110, 210, 310, a configuration of the modules is depicted schematically. Here, the modules each comprise a memory area 120, 220, 320, where the memory area 120, 220, 320 of the respective modules 110, 210, 310 respectively stores a piece of port information 150, 250, 350 regarding what are known as "cyber-physical ports" that are present in the respective module. The port information 150, 250, 350 depicted in FIG. 1 is an example of port information in accordance with the present invention. Additionally, the memory area 120, 220, 320 of the respective production modules comprises a respective piece of configuration information 130, 230, 330 regarding functional and also electronic, mechanical and communicative configurations and also properties of the respective module. Additionally, the memory area 120, 220, 320 of the respective modules comprises a functionality description 140, 240, 340 of the respective module, a description of available instructions 160, 260, 360 and also one or more pieces of state information 170, 270, 370 regarding the respective module 110, 210, 310. The configuration information 130, 230, 330, the functionality descriptions 140, 240, 340, the descriptions of available instructions 160, 260, 360 and state information 170, 270, 370 are each examples of self-description information in accordance with the present invention. The aforementioned self-description and port information will be explained further by way of example in connection with FIG. 2.

Additionally, each of the production modules 110, 210, 310 comprises an automation and/or control device 180, 280, 380 for automating or controlling and handling the various functionalities and services that the respective production module 110, 210, 310 provides. Additionally, each of the production modules 110, 210, 310 contains one or more electronic assemblies or electronic modules 182, 282, 382 that are required and used for operating actuators, for example, and also other electronic, optical and other devices of the module 110, 210, 310. Also, each of the modules 110, 210, 310 comprises mechanical elements 184, 284, 384.

The arrows 190, 192, 194, 196 depicted in FIG. 1 depict an exemplary communication cycle in the event of changes in the first production module 110. In this regard, the second production module 210, for example, uses an applicable message 190 to register with the first production module 110 as a "subscriber", i.e., as a module connected to the first production module 110. This registration can be effected during the coupling or immediately after the coupling of the two modules or later, such as. In the same way, the third production module 310 uses an applicable "subscriber" message 192 to register with the first production module 110. In the event of changes in the first production module, for example a change of state from a normal state to a stop state, which is then stored in the state information 170 of the first production module 110, the first production module 110 then sends an applicable change message 194 to the second production module 210 and also an applicable message 196 to the third production module 310. In this way, the second and third production modules 210, 310 are informed about the change of state in the first production module 110 and can take this into consideration for coordinating a production chain or joint conditioning or treatment of a product, for example.

A communication scheme of this kind can, in principle, be used to ensure that, in the event of changes in one of the production modules 110, 210, 310, the production modules directly or indirectly connected thereto are each informed and this can be taken into consideration for the interaction within the production system 100. An applicable "subscription" process may then be established, mutatis mutandis, in the same way from the first and third production modules 110, 310 to the second production module 210 and from the first and second production modules 110, 210 to the third production module, so that all three of the modules 110, 210, 310 depicted in FIG. 1 use such a mechanism to inform one another about changes as applicable in each case.

The production modules 110, 210, 310 can in this case be referred to as what are known as "cyber-physical modules" (CPM), or as what are known as "cyber-physical production modules" (CPPM), and comprise such modules. In this context, the production system 100 can also be referred to as what is known as a "cyber-physical system" (CPS), for example, and is configured in this manner.

Figure 2:
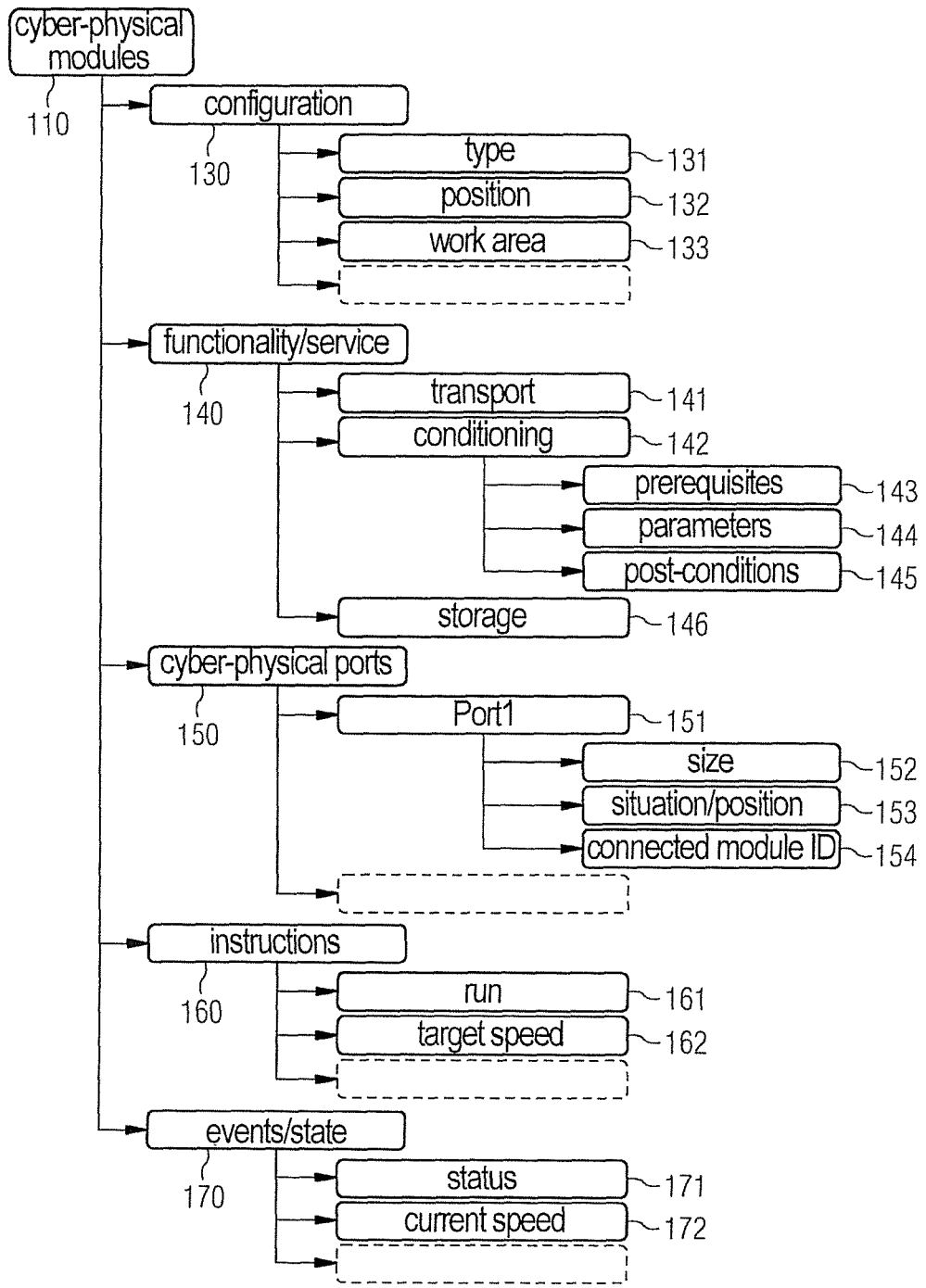
FIG. 2 shows a more detailed example of a data structure of a production module in accordance with the invention.

FIG. 2 shows the example of a schematic configuration the memory unit 120 depicted in FIG. 1 in the first production module 110. This self-description information and port information memory 120 comprises a piece of configuration information 130 that stores a module type 131, a geometric situation or arrangement 132 of the module or of functional elements of the module and also a work area 133 of the module 110, for example. Here, the "type" 131 can consist of an applicable identifier or one or more functional descriptors, for example, or comprise such information. The piece of information about the work area 133 can contain a description of a spatial area, for example, in which products may be present in the applicable production module 110 or within which these products can be moved. As such, by way of example, a work area of a transport belt may be a volume area extending longitudinally along the transport belt and in which the product can be moved via the transport belt. In the case of a conditioning machine, the work area may be the volume area in which a conditioning element of the machine can influence a product located therein, for example. Applicable work areas can be ascertained for further functionalities within the context of the above-described production functions.

Additionally, the memory area 120 of the first production module 110 comprises a piece of functionality and service information 140, where this piece of information comprises further information pertaining to transport options 141 with the module, conditioning options 142 of the module or storage options 146 for racking or storing products or materials. By way of example, the conditioning information 142 can additionally comprise information pertaining to prerequisites for use of the applicable conditioning functions 143, applicable parameters that denote the conditioning functions in more detail 144 and/or post-conditions 145 that are characteristic of or necessary for further treatment of the product after conditioning.

Quite generally, a production module in accordance with the present invention can respectively also comprise multiple instances of the cited production functionalities, in which case a piece of information can then be stored or is stored in an applicable memory device, such as, for each of the functionalities. As such, by way of example, a production module can have multiple transport functionalities, for example via one or more transport belts or robot arms or a combination thereof, can have various conditioning functions and also can have various storage options.

The memory device 120 of the production module 110 additionally stores a piece of port information 150 about what is known as a "cyber-physical port" for a further production module. This "cyber-physical port" can comprise both information about a functional cooperation of coupled production modules and information about functionalities available in the modules coupled in this manner.

As such, the piece of port information 150 contains, by way of example, information about a first "cyber-physical port" 151 for an adjacent, coupled production module, such as the second production module 210 shown in FIG. 1. In this case, the applicable piece of port information 151 contains, by way of example, a piece of information about a size of the interaction or transfer area 152 for the second production module, a situation or position of the transfer area 153 and an identifier 154 of the connected module 210. Additionally, by way of example, a piece of information about a functionality of the second production module and information about functionalities of further production modules connected to the second production module 210 may be stored in the applicable piece of port information 151. If a further direct connection were to exist from the first production module 110 to a further production module, such as the third production module 310 shown in FIG. 1, then an applicable piece of port information would also be stored for this applicable "cyber-physical port" for the third production module 310 in the general piece of port information 150.

Additionally, the memory area 120 of the first production module 110 contains a piece of information 160 about instructions or commands usable in the production module for the control thereof. As such, this instruction memory 160 has a record of, by way of example, information pertaining to a run instruction 161 or pertaining to a target speed instruction 162, which information defines these instructions with applicable usable parameters, where the instructions are readable by a user of the system for the purpose of setting up a control for the production module 110.

The event/state information area 170 in the memory device 120 of the first production module 110 stores, by way of example, information about the current status of the production module 171 and, by way of example, about the current speed of a motor of the module 172.

All of the information shown in FIG. 2 that is stored in the first production module 110 allows cooperation of multiple such production modules to be organized and a joint production cycle for such coupled production modules to be obtained even with relatively little action from a user, or even without any action from a user. The cited information allows a further module coupled to such a production module to identify both information about functionalities using the geometry and information about the state and the actuation and control options for a module and also the coupling options for coupling to the module and to take this into consideration for a semi-automated or automated planning process, for example.

Figure 3:
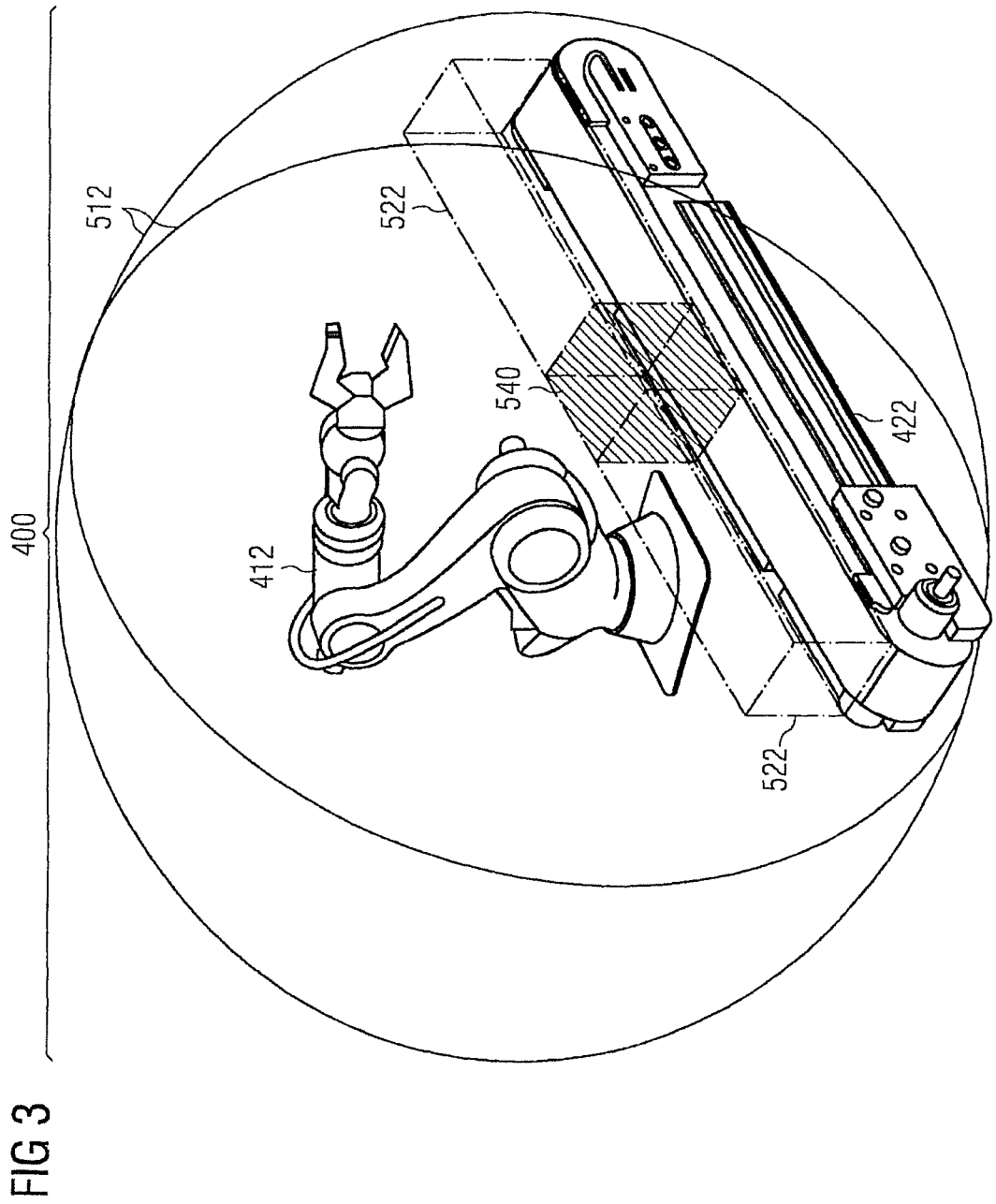
FIG. 3 shows an example of a combination of a robot with a transport module in accordance with the invention.

FIG. 3 depicts a small detail from a larger production system 400, where this detail comprises a robot 412 and a transport or conveyor belt 422. In this case, FIG. 3 depicts, for the transport or conveyor belt 422, a work area 522 within whose volume area a product is transportable. The piece of information about the work area 522 may be stored within an applicable piece of configuration information in a memory of the transport belt 422, for example. Additionally, a work area 512 of the robot arm 412 is defined by circular lines that denote a spherical work area for the robot arm 412. FIG. 3 also depicts an interaction area 540 between the transport belt 422 and the robot arm 412, within which a product must be located in order for it to be transferred to the transport belt 422 by the robot arm 412 or picked up from the transport belt 422 by the robot arm 412.

The piece of information about this interaction area may then be stored in a memory device of the transport belt 422 and/or in a memory area of the robot arm 412, for example. The interaction area 540 can be ascertained when the robot arm 412 is coupled to the transport belt 422, for example. If the geometric situation between the robot arm 412 and the transport belt 422 is changed, then a changed interaction area 540 can also be ascertained. The interaction area can be ascertained as explained in more detail in accordance with the present invention, for example.

The coupling of the transport belt 422 to the robot arm via the interaction area 540 is describable as a "cyber-physical port" of the transport belt 422 for the robot arm 412, for example. Equally, from the point of view of the robot arm 412, the coupling to the transport belt 422 via the interaction area 540 is describable as an applicable "cyber-physical port". This is depicted schematically in FIG. 4.

Figure 4:
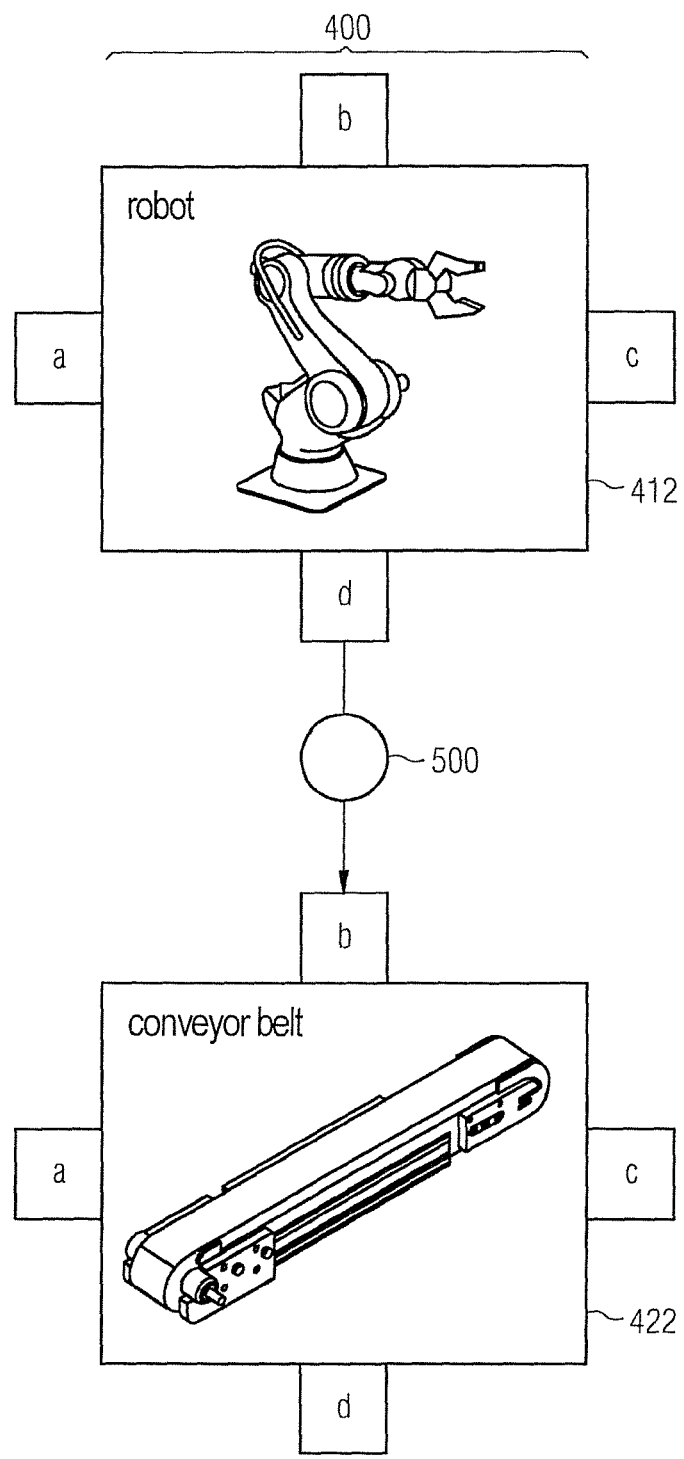
FIG. 4 shows a schematic structure of the example of a production system depicted in FIG. 3.

FIG. 4 shows a schematic depiction of the robot arm 412 and a schematic depiction of the transport or conveyor belt 422. Here, the "cyber-physical port" 412/*d* is identified as a square denoted "d" in FIG. 4 from the point of view of the robot 412 toward the transport belt 422. Equally, the "cyber-physical port" 422/*b* is depicted as a square with "b" on the schematic depiction of the conveyor belt 422 from the point of view of the conveyor belt 422 toward the robot 412. Additionally, FIG. 4 depicts further potential "cyber-physical ports" of the robot arm 412, 412/*a*, 412/*b*, 412/*c* that symbolize applicable "cyber-physical ports" 412/*a*, 412/*b*, 412/*c* for adjacent modules, not depicted in FIG. 4, and applicable memory devices for applicable port information. In the same way, further "cyber-physical ports" 422/*a*, 422/*c*, 422/*d* are also depicted for the conveyor belt 422, which symbolize potential "cyber-physical ports" for further production modules, not depicted in FIG. 4, or memory areas for applicable port information.

Additionally, FIG. 4 depicts a product 500 to be transferred from the robot 412 to the transport belt 422. In the schematic depiction of FIG. 4, this is depicted such that the product 500 is taken more or less to the "cyber-physical port" 412/*d* of the robot 412 for the conveyor belt 422 by the robot and then transferred to the "cyber-physical port" 422/*b* of the conveyor belt for the robot 412 so as then, e.g., to be transported further by the conveyor belt 422.

In this case, both pieces of port information 412/*d* and 422/*d* describe, at least inter alia, the same three-dimensional interaction area in order to be able to implement an applicable product transfer.

Figure 5:
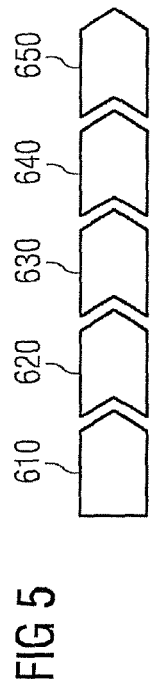
FIG. 5: shows an example of the method sequence for the coupling of two production modules in accordance with the invention.

FIG. 5 shows an example of a schematic sequence for the coupling of two production modules that can be configured in accordance with the present invention or particularly in accordance with the production modules depicted in FIGS. 1 to 4, for example.

In a first step 610, a new production module is associated with an already installed production module. This association 610 can, by way of example, be initiated by means of a manual user action, e.g., via an applicable touchscreen of the modules or an applicable network connection, or by applicable distance sensors or similar sensors that identify the new module as adjacent to the installed module. The associated modules therefore become neighbors and register as such with the respective other module via applicable communication means. This reciprocal registration can prompt, at least inter alia, applicable changes on each of the modules to be communicated to the respective other module. This can be attained via a subscription communication mode, for example, as has been explained in connection with FIG. 1.

In an orientation step 620, a topological orientation for the positions and work areas of the modules is then attained or set up. This can occur using a coordinate system of the already installed module, for example. Depending on the available technology, this can occur in a fully automated manner (e.g. using an applicable positioning system and what is known as "near field communication" or RFID technology). Additionally, the modules can, by way of example, also instruct a user, e.g., via an applicable user panel, how, e.g., the new module needs to be moved or oriented.

Such an orientation can be attained more easily if an applicable lattice or honeycomb structure is stipulated for the entire production system, as explained in more detail in connection with FIG. 6.

In a computation step 630, the "cyber-physical ports" are computed automatically, this comprising the computation of a sectional volume between the work areas of both modules, inter alia. A sectional volume of this kind is an example of an interaction area in accordance with the present invention. The information about the respective work areas of the individual modules is stored in the respective modules and is also transmitted by the latter to other modules. In this way, the already installed module can find out the work area of the new module from the latter and then use the knowledge of its own work area and a relative positioning to compute the sectional volume. If the result of the computation is that the two work areas do not overlap, then the applicable modules normally cannot simply be functionally coupled.

In a fourth information interchange step 640, the applicable service information regarding the properties of the respective production modules is interchanged with the other production module. The registration and publication mechanism already explained in connection with FIG. 1 can be used to provide the already installed module with a transmission of the information regarding the properties of the new module, for example, and the already installed module can store the information on itself and if need be forward it to further modules already connected to the already installed module. The piece of information about the functionality and the properties or identifier of the new production module can then be stored in the piece of port information of the installed module regarding the new module, for example.

In a harmonization step 650, the functionality of the already installed module is then harmonized with the freshly installed module to allow the functionalities of the two modules to interact. Such harmonization can involve the matching of transport speeds of two interconnected transport belts or the matching of a transport speed to a conditioning process to be performed, for example. Following the conclusion of the cooperation step 650, the new production module and the already installed production module can interact for conditioning and production of a product.

Figure 6:
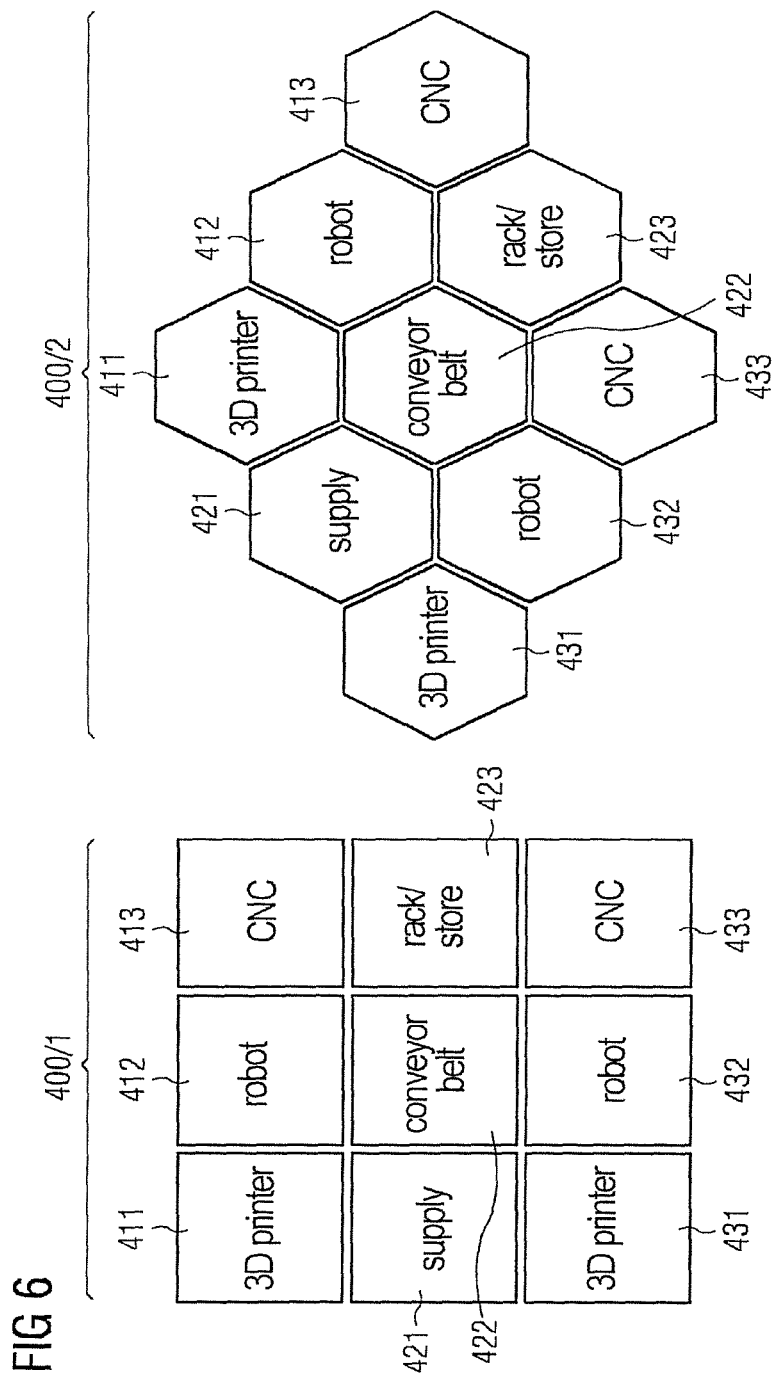
FIG. 6 shows examples of two-dimensional arrangement structures of production modules to form a production system in accordance with the invention.

FIG. 6 shows two examples of three-dimensional regular arrangements of the production system 400, where the complete production system 400 is now depicted in FIG. 6. A first square grid structure of the production system 400/1 contains each of the production modules inside a square two-dimensional area. Here, the production system 400 comprises two 3D printers 411, 431, two robots 412, 432 and two CNC machines 413, 433 (CNC: Computerized Numerical Control). Additionally, the production system comprises a supply and transport unit 421 for the product, a transport or conveyor belt for the product 422 and a transport and storage unit 423.

The three-dimensional embodiment of the respective module outlines allows the individual production modules to be configured such that they are located completely within the applicable square two-dimensional area, and also the distances from the edges of the respective square cells are known. Hence, during the actual development of the individual modules, applicable mechanical elements for transporting or for conditioning the products may be formed such that interaction with an adjacent square cell is possible. The manufacture of a production system 400/1 accordingly configured with a square structure can be facilitated by applicable housing shapes or support platforms for the individual production modules, for example.

FIG. 6 additionally shows an alternative embodiment of the production system as a hexagonal honeycomb system 400/2 in which the production modules of the production system 400 are configured in a respective hexagonal cell arrangement and assembled to form a production system.

Figure 7:
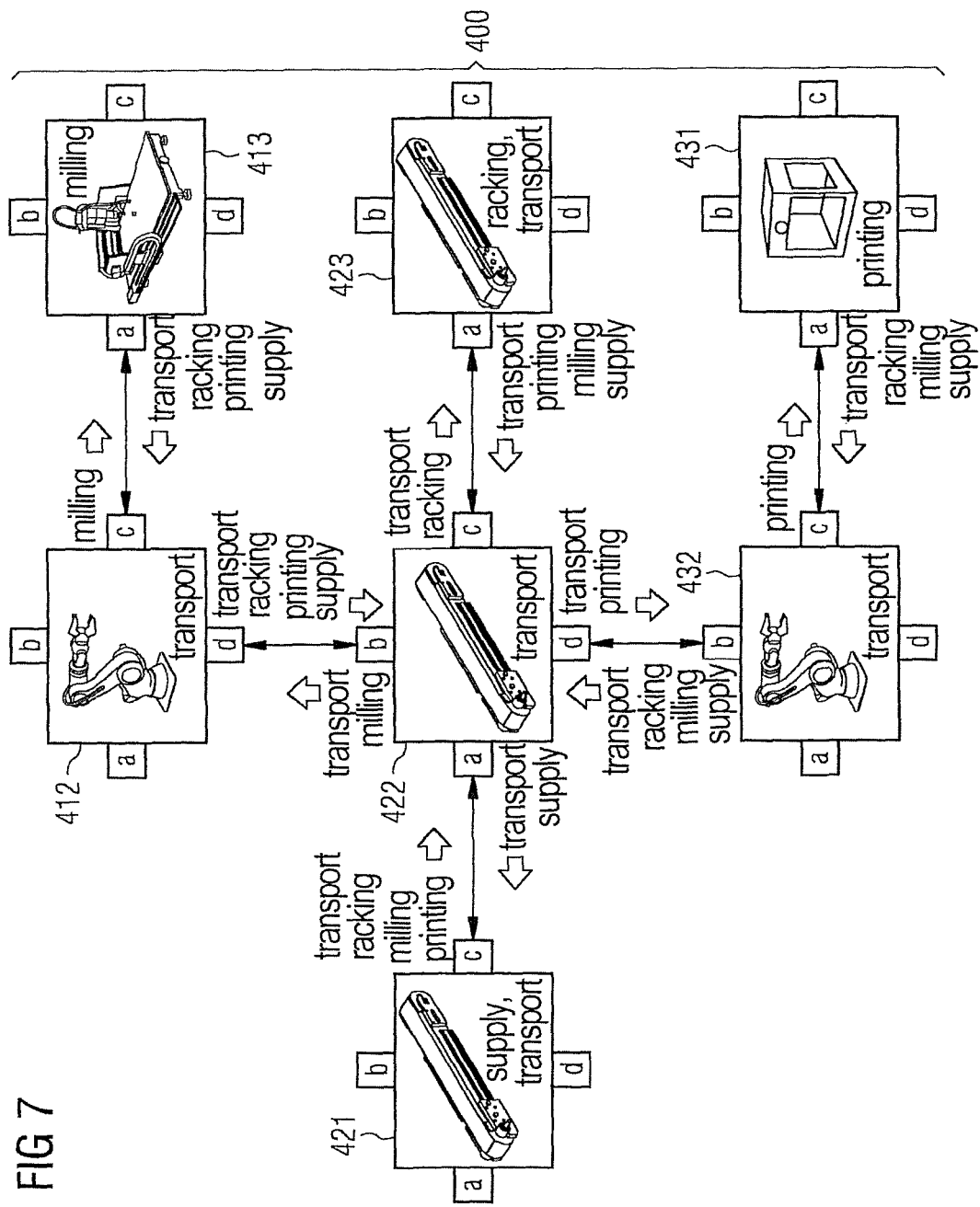
FIG. 7 shows a more detailed schematic depiction of the production system with a square arrangement depicted in FIG. 6.

FIG. 7 depicts the production system 400 depicted in FIG. 6 in a detail and a more functional depiction. FIG. 7, in contrast to FIG. 6, depicts the production system 400 with only one 3D printer 431 and only one CNC milling machine 413.

The depiction of the individual production modules in FIG. 7 is provided symbolically, with four "cyber-physical ports" a, b, c, d being depicted for each of the production modules as appended, small squares that symbolize a possible or existing "cyber-physical port".

As such, the transport or conveyor belt 422 has four existing "cyber-physical ports" 422/a, 422/b, 422/c, 422/d, for example. Here, the "cyber-physical port" 422/a for the supply/transport module 421 symbolizes the "cyber-physical port" for this module. The information stored with reference to this "cyber-physical port" 422/a also comprises all of the functionalities that are attainable via this "cyber-physical port". These attainable functionalities are written as text beside the respective square symbol of the "cyber-physical port" in FIG. 7. As such, the "cyber-physical port" 422/a contains, inter alia, the information that via this port, i.e., this connection, for the supply/transport module, the functionalities: "transport" and "supply" that can be performed by the applicable module 421 are attainable. Via the port 422/b of the transport module 422 for the robot 412, the "transport" and "milling" functionalities are available, for example, these then being stored in the applicable piece of port information 422/b. In this case, the "transport" functionality is performed by the robot 412, while the "milling" functionality is performed by the CNC milling machine 413 connected to the robot 412.

Via the port 421/c of the supply/transport module 421, in this way all functionalities (other than those inherent) of the production system 400, as depicted in FIG. 7, are available, i.e., the "transport", "racking", "milling" and "printing" functionalities in the widest variety of ways.

In this way, for a product located in a particular module, and known next required work steps, a production cycle for further production of the product can be determined as required by analyzing the port information of the respective module in each case.

The organization of the individual pieces of function information stored in the ports about the connected modules can be achieved via an information distribution step, for example, as has been explained in connection with step 640 in FIG. 5, for example. A change forwarding mechanism, as explained in connection with FIG. 1, for example, can then be used to keep the respective information up to date.

Figure 8:
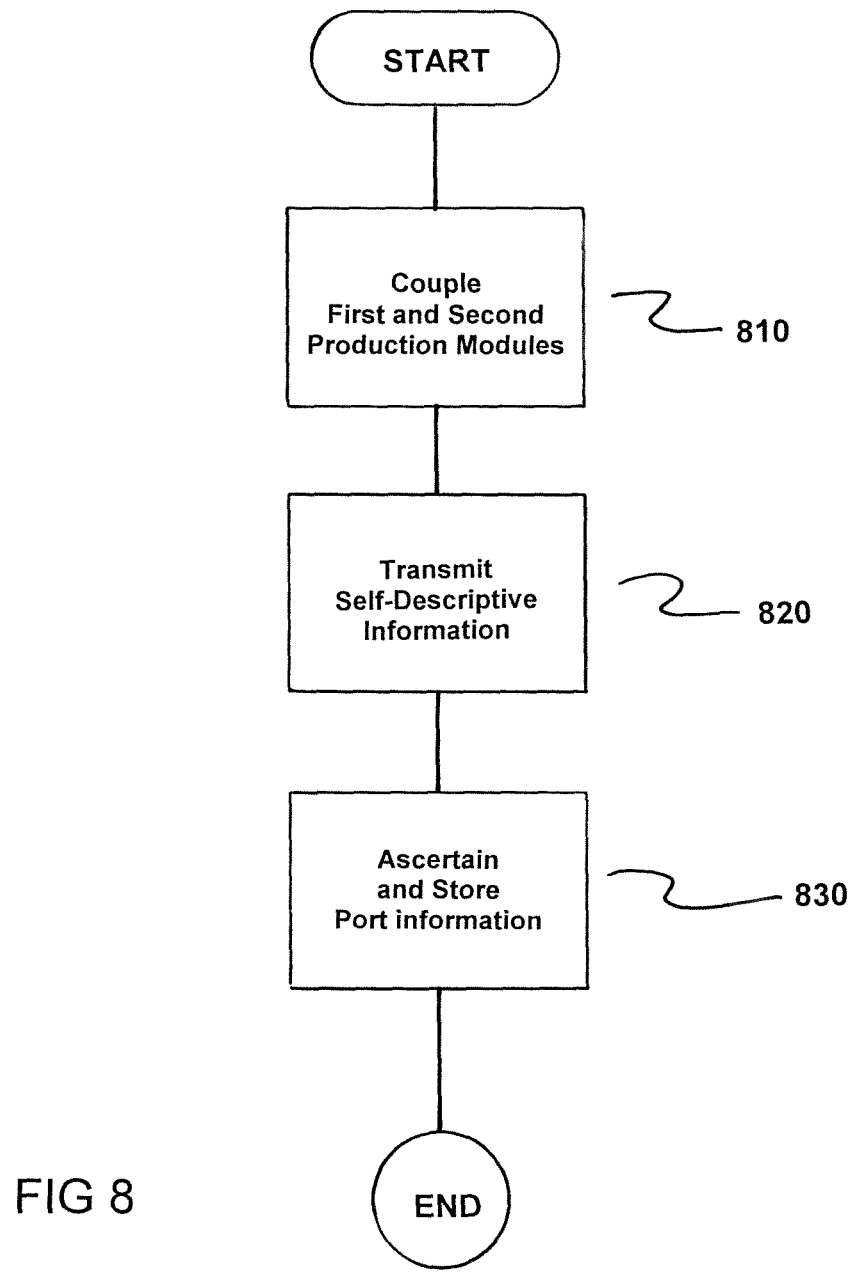
FIG. 8 is a flowchart of the method in accordance with the invention.

FIG. 8 is a flowchart of the method for coupling a first production module 110, 210, 310, 411, 412, 413, 421, 422, 423, 431, 432, 433 to a second production module 110, 210, 310, 411, 412, 413, 421, 422, 423, 431, 432, 433, where the first production module is configured to perform a first production function on a product 500 and the second production module is configured to perform a second production function on the product 500, and the first production module stores a first piece of self-description information 130, 140, 160, 170, 230, 240, 260, 270, 330, 340, 360, 370 regarding properties of the first production module and the second production module stores a second piece of self-description information 130, 140, 160, 170, 230, 240, 260, 270, 330, 340, 360, 370 regarding properties of the second production module.

The method comprises coupling the first and second production modules, as indicated in step 810.

Next, the second piece of self-description information of the second production module is transmitted to the first production module, as indicated in step 820.

A first piece of port information 150, 151, 152, 153, 154, 250, 350 regarding the coupling to the second production module is now ascertained via the first production module and the first piece of port information is now stored in the first production module, as indicated in step 830.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A production module for performing a production function on a product, the production module being configured to couple to a second production module which is configured to perform a second production function on the product, the production module comprising:
   a memory device configured to store a piece of self-description information regarding properties of the production module;
   wherein the second production module comprises a second piece of self-description information regarding properties of the second production module;
   wherein the production module is configured to transmit the piece of self-description information to the second production module and to receive the second piece of self-description information from the second production module;
   wherein one of (i) the memory device of the production module stores a piece of port information regarding the coupling to the second production module and (ii) the production module is configured to store the piece of port information regarding the coupling to the second production module; and
   wherein the piece of port information regarding the coupling to the second production module comprises information regarding properties of the second production module including a piece of information about a size of an interaction or transfer area for the second production module, a situation or position of the transfer area and an identifier of the coupled second production module.

2. The production module as claimed in claim 1, wherein the piece of port information regarding the coupling to the second production module further comprises a piece of information about a three-dimensional interaction area of the production module with the second production module; and
   wherein the interaction area is configured such that the production function of the production module and the second production function of the second production module can influence the product when said product is located in the interaction area.

3. The production module as claimed in claim 2, wherein the piece of port information further comprises a piece of information about at least one of (i) a geometry of the interaction area and (ii) a position of the interaction area.

4. The production module as claimed in claim 1, wherein the piece of port information regarding the coupling to the second production module further comprises information regarding properties of further production modules at least one of directly and indirectly connected to the second production module.

5. The production module as claimed in claim 4, wherein the information regarding properties of further production modules at least one of directly and indirectly connected to the second production module comprises production functions of production modules at least one of directly and indirectly connected to the second production module.

6. The production module as claimed in claim 1, wherein the piece of port information stored in the production module regarding the coupling to the second production module further comprises information regarding properties of a third production module coupled to the second production module;
   wherein the third production module is coupled to the second production module, the third production module storing or can store a third piece of self-description information regarding properties of the third production module, and the third production module being configured to perform the third production function on the product.

7. The production module as claimed in claim 6, wherein the piece of port information stored in the production module regarding the coupling to the second production module further comprises information regarding a third production function of the third production module.

8. The production module as claimed in claim 1, wherein the piece of port information regarding the coupling to the second production module further comprises information regarding the second production function of the second production module.

9. A production system for manufacturing an intermediate product or end product, comprising:
   a plurality of production modules coupled to one another, each of the plurality of production modules being configured as claimed in claim 1.

10. The production system as claimed in claim 9, wherein each of the production modules stores the piece of port information as claimed in claim 1 for each production module directly coupled to this production module from the plurality of production modules.

11. The production system as claimed in claim 10, wherein a relative arrangement of the plurality of coupled production modules corresponds to at least one of (i) a prescribed or prescribable three-dimensional and (ii) two-dimensional structure.

12. The production system as claimed in claim 9, wherein a relative arrangement of the plurality of coupled production modules corresponds to at least one of (i) a prescribed or prescribable three-dimensional and (ii) two-dimensional structure.

13. The production system as claimed in claim 12, further comprising:
means for attaining or observing the prescribed or prescribable structure.

14. A production module for performing a production function on a product, comprising:
a memory device which stores or can store a piece of self-description information regarding properties of the production module including (i) a piece of configuration information regarding at least one of a situation and an embodiment of the production module, (ii) a piece of capability information regarding available functions and services of the production module, said piece of capability information comprising a piece of information about the production function, (iii) a piece of instruction information regarding instructions executable by the production module and adjustable parameters and (iv) a piece of state information regarding an operating state of the production module;
wherein the production module is configured to ascertain a shared three-dimensional interaction area with a second production module coupled to the production module;
wherein the second production module is configured to perform a second production function on the product; and
wherein the shared three-dimensional interaction area of the production modules is configured such that the production function of the production module and the second production function of the second production module can influence the product when said product is located in the interaction area.

15. The production module as claimed in claim 14, wherein the memory device of the production module stores or can store a piece of port information regarding the coupling to the second production module; and
wherein the piece of port information comprises a piece of information about the three dimensional interaction area of the production module with the second production module.

16. The production module as claimed in claim 15, wherein the piece of information about the three dimensional interaction area of the production module with the second production module comprises at least one of (i) a piece of information about a geometry of the interaction area and (ii) a position of the interaction area.

17. A method for coupling a first production module to a second production module, the first production module being configured to perform a first production function on a product and the second production module being configured to perform a second production function on the product, and the first production module storing a first piece of self-description information regarding properties of the first production module including status information and the second production module storing a second piece of self-description information regarding properties of the second production module including (i) a piece of configuration information regarding at least one of a situation and an embodiment of the production module, (ii) a piece of capability information regarding available functions and services of the production module, said piece of capability information comprising a piece of information about the production function, (iii) a piece of instruction information regarding instructions executable by the production module and adjustable parameters and (iv) a piece of state information regarding an operating state of the production module, the method comprising:
coupling the first and second production modules;
transmitting the second piece of self-description information of the second production module to the first production module including (i) the piece of configuration information regarding at least one of the situation and the embodiment of the production module, (ii) the piece of capability information regarding available functions and services of the production module, said piece of capability information comprising the piece of information about the production function, (iii) the piece of instruction information regarding instructions executable by the production module and adjustable parameters and (iv) the piece of state information regarding the operating state of the production module; and
ascertaining a first piece of port information regarding the coupling to the second production module via the first production module and storing the first piece of port information in the first production module;
wherein said ascertaining at least one of (i) the first and (ii) second piece of port information comprises ascertaining a piece of information about a three-dimensional interaction area of the first production module with the second production module; and
wherein the interaction area is configured such that the first production function of the first production module and the second production function of the second production module can influence the product when said product is located in the interaction area.

18. The method as claimed in claim 17, wherein said coupling of the first and second production modules is additionally followed by:
transmitting the first piece of self-description information of at least one of (i) the first production module and (ii) the first piece of port information to the second production module; and
ascertaining by the second production module ascertaining a second piece of port information regarding the coupling to the first production module and storing said information in the second production module.

19. The method as claimed in claim 17, wherein said ascertaining the piece of information about the three-dimensional interaction area is followed by a relative situation of the first production module in relation to the second production module being changed and the piece of information regarding the three-dimensional interaction area subsequently being re-ascertained.

20. The method as claimed in claim 17, wherein the first and second production modules are each configured to couple to a third production module which is configured to perform a third production function on the product, each production module comprising:
a memory device configured to store a piece of self-description information regarding properties of the production module including status information;
wherein the third production module comprises a third piece of self-description information regarding properties of the third production module including status information;
wherein each production module is configured to transmit the piece of self-description information to the third production module and to receive the third piece of self-description information from the third production module; and wherein one of (ii) the memory device of each production module stores a piece of port information regarding the coupling to the third production module and (ii) each production module is configured to store a piece of port information regarding the coupling to the third production module.

21. The method as claimed in one of claim 17, wherein the first production module is coupled to the second production module such that the relative arrangement of the coupled production modules corresponds to a prescribed or prescribable three-dimensional or two-dimensional structure.

22. The method as claimed in claim 21, further comprising:

attaining or observing, via means for attaining or observing, the prescribed or prescribable structure;

wherein the first production module is coupled to the second via said means such that the relative arrangement of the coupled production modules corresponds to the prescribed or prescribable three-dimensional or two-dimensional structure.

\* \* \* \* \*